United States Patent [19]

Rodgers

[11] Patent Number: 4,614,302

[45] Date of Patent: Sep. 30, 1986

[54] HOSE END NOZZLE WITH SUBSTANCE INJECTOR

[76] Inventor: J. Linn Rodgers, 9606 La Serna Dr., Whittier, Calif. 90605

[21] Appl. No.: 712,130

[22] Filed: Mar. 15, 1985

[51] Int. Cl.⁴ .......................................... B05B 11/02
[52] U.S. Cl. .................................. 239/315; 239/321; 222/133
[58] Field of Search ............... 239/310, 313, 315, 317, 239/320, 321, 329; 222/133

[56] References Cited

U.S. PATENT DOCUMENTS

| | | | |
|---|---|---|---|
| 2,556,609 | 6/1951 | Arkless | 239/321 |
| 2,991,939 | 7/1961 | Packard | 239/310 |
| 3,989,391 | 11/1976 | Thorner | 239/310 |
| 4,123,004 | 10/1978 | Jerry | 239/310 |
| 4,171,169 | 10/1979 | Williams | 239/315 |

*Primary Examiner*—Joseph F. Peters, Jr.
*Assistant Examiner*—Scott D. Malpede
*Attorney, Agent, or Firm*—Donald D. Mon

[57] ABSTRACT

A hose end nozzle assembly with a handle, a body with an internal mixing chamber, and a nozzle discharging from the mixing chamber. A dispenser opens into the mixing chamber. It includes a piston-cylinder assembly by means of which liquid held in the dispenser can be ejected into the mixing chamber.

4 Claims, 3 Drawing Figures

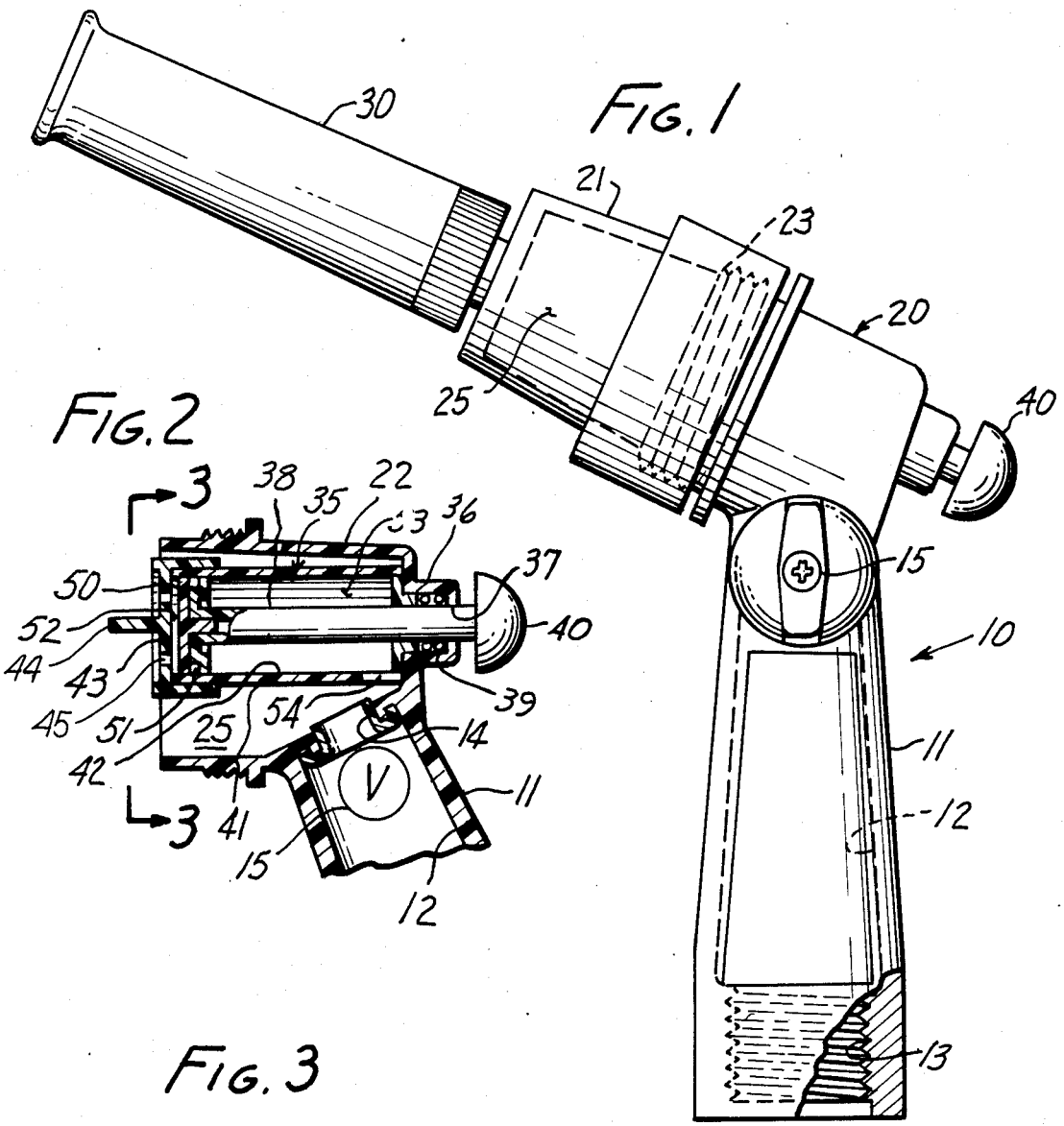

HOSE END NOZZLE WITH SUBSTANCE INJECTOR

FIELD OF THE INVENTION

This invention relates to hose end nozzles such as are used for washing automobiles, with means to inject substances such as detergents into the water stream.

BACKGROUND OF THE INVENTION

Hose end nozzles with means for adding substances into the water stream are known. One common type utilizes an aspirator to meter liquids into the stream. Another type places solid pellets in a basket or screen in the path of the flow, which are dissolved into the stream.

Aspirator types tend to be expensive and are usually used when accuracy of proportion is important, for example in gardening. They are generally not suited for rougher usages such as in washing automobiles, when the user frequently drops or bangs the assembly onto or against something.

Devices which utilize pellets are in and of themselves quite suitable for such hard usage. Their proportioning is not especially precise, but nobody really cares, so long as sufficient substance (such as soap or detergent) is supplied to do the job. The objection to them relates more to their practicality for continuing usage, and their attractiveness to a customer who realizes that he must always return to some special place to get a special pellet. Often this is regarded as too much trouble, so the device is discarded or is not purchased at all.

It is an object of this invention to provide a hose end nozzle assembly which can inject any liquid or dissolved originally pelletized substances into the stream, so as to enable the customer to use his own favorite detergent (or pellet if he has a supply). The product is then freed from limitations imposed by the substance to be injected. The product thereby becomes more broadly useful, and more attractive to the purchaser.

BRIEF DESCRIPTION OF THE INVENTION

A hose end nozzle assembly according to this invention has a handle with a passage through it that connects to the end of a hose. A body joins to the handle and has an internal mixing chamber which receives water from the passage. A discharge nozzle discharges water from the mixing chamber.

According to a feature of this invention, a dispenser is provided which has an outlet discharging into the mixing chamber. The dispenser includes a cylinder with an axial cylindrical wall, a piston in the cylinder which makes a sliding fluid sealing fit with the cylinder wall, and a piston rod which is attached to the piston and available to the hand of the user. Reciprocation of the rod enlarges or reduces the volume of the cylinder on the side of the piston facing the outlet.

The cylinder has an aperture and a closure for it, which enables a substance to be poured or placed in the cylinder. When the closure is fixed, and the rod is pushed, substance is ejected into the mixing chamber to mix with the water stream. The amount and rate of ejection is determined by how far and how fast the rod is pushed.

According to a preferred but optional feature of the invention, a balance passage extends from the mixing chamber to the cylinder on the side of the piston opposite from the side facing the outlet. Then system pressure is equalized on both sides of the piston.

According to yet another preferred but optional feature of the invention, the cylinder projects into the mixing chamber, the closure is a cap to fit over the end of the cylinder and has the outlet in it, and the body is in two mating parts, giving access to the mixing chamber and to the closure and cylinder.

The above and other features of the invention will be fully understood from the following detailed description and the accompanying drawings, in which:

BRIEF DESCRIPTION OF THE DRAWINGS

FIG. 1 is a side view of the presently preferred embodiment of the invention;

FIG. 2 is an axial section, partly in cutaway cross-section, showing part of FIG. 1; and FIG. 3 is a view taken at line 3—3 in FIG. 2.

DETAILED DESCRIPTION OF THE INVENTION

The presently preferred hose end nozzle assembly 10 is shown in FIG. 1. It has a handle 11 with a passage 12 therethrough, which terminates at one end with an internal thread 13. Thread 13 can be engaged to the end of a hose (not shown). The upper end of the passage terminates at a port 14.

A rotary core off-on valve 15 is placed in the passage just upstream of port 14. This is an optional feature, which enables the user to shut off water to a mixing chamber yet to be described, without shutting off the supply of water to the nozzle assembly.

The assembly also includes a body 20. Body 20 has two parts, 21, 22, which are engageable to each other by threads 23. Body part 22 is unitary with the handle. Inside the joined body parts there is formed a mixing chamber 25.

A nozzle 30, which may be a classical spray-adjustable garden nozzle, connects to body part 21, and discharges water from the mixing chamber.

A dispenser 35 is provided to dispense substances into the mixing chamber. While it can be located entirely or partly externally of the body, it is most advantageously placed inside the mixing chamber as shown, when the device is made of cast or molded plastic parts.

The second body part has a stud 36 with an aperture 37 to pass piston rod 38. Seals 39 seal between the body and the piston rod. A head 40 on the rod can be grasped or pushed to reciprocate the rod.

The dispenser includes a cylinder 41 with an internal axial cylindrical wall 42. A closure 43 (sometimes called a cap) fits the open end of the cylinder to close it. A tab 44 can be grasped by the hand to remove the closure. An outlet 45 through the closure provides for limited fluid flow into and out of the cylinder. The closure may be a cap as shown, or a plug. Outlet 45 could instead pass through the wall of the cylinder near the same end.

A piston 50 makes a fluid-sealing sliding fit with the cylindrical wall. It is connected to the piston rod. It carries a peripheral sealing ring 51. The region 52 between the piston and the closure is to receive and dispense a desired substance. The region 53 between the piston and the other end of the cylinder is vented by balance passage 54 to the mixing chamber. This reduces the unbalanced forces across the piston, so that less effort is needed to move the piston to the left in FIG. 1 when there is pressure in the mixing chamber. Passage 54 is optional.

The dispenser may be cemented or otherwise fitted as shown to the wall of the first body part.

The assembly is convenient to use. To load it, the body parts are unscrewed from one another, the closure removed, the piston moved to the right relative to FIG. 1, and a substance such as a liquid detergent is poured into it. Then the cap is replaced and the body parts are threaded together. Thereafter, water is turned on. When the substance is to be ejected into the mixing chamber, the piston rod is pushed to the left relative to FIG. 1. The rate and amount of discharge are determined by the rate of movement of the piston.

If preferred, solid pellets could be placed in the dispenser, and from time to time the rod could be moved to pull water in so as to dissolve some of the pellet material. Then the rod would be pushed to expel the resulting solution. Thus, the utility of this device is not limited to the injection of only originally-liquid substances.

This invention thereby provides a conveniently manufactured device with broader utility than known devices with similar intended functions.

This invention is not to be limited by the embodiments shown in the drawings and described in the descriptions, which are given by way of example and not of limitation, but only in accordance with the scope of the appended claims.

I claim:

1. A hose end nozzle assembly comprising a body having a handle having a passage therethrough, with a threaded opening adapted to engage the threads on the end of a hose, said body having an internal mixing chamber, said mixing chamber being in fluid-receiving communication with said passage in said handle;

a discharge nozzle mounted to said body and in fluid-receiving communication with said mixing chamber to discharge water therefrom; and a dispenser having an outlet discharging into said mixing chamber, said dispenser including a cylinder inside said mixing chamber with an internal axial cylindrical wall, a piston in sliding fluid-sealing relationship with said wall, a piston rod connected to said piston and adapted to reciprocate said piston in said cylinder so as to enlarge or reduce the volume of the cylinder between said outlet and said piston, said piston rod projecting beyond said body for engagement by the hand of a user which is also gripping the handle, to move said piston rod and said piston, said dispenser having an aperture opening into said cylinder, and a closure therefore to enable liquid material to be poured into said cylinders and contained therein for expulsion through said aperture by axial movement of said piston, said aperture being on one side of said piston, there being a balance passage from said mixing chamber into said cylinder always opening into said cylinder on the other side of said piston;

said body being formed in two separable mating parts to give access to said mixing chamber and to said dispenser when separated, said dispenser including a removable closure accessible by hand when said parts are separated to enable the dispenser to be supplied with a material to be dispensed.

2. A hose end nozzle assembly according to claim 1 in which said aperture is formed through said closure.

3. A hose end nozzle assembly according to claim 1 in which said body parts are threadably joinable to one another.

4. A hose end nozzle assembly according to claim 1 in which a rotary off-on valve is disposed between said handle in said passage and said mixing chamber.

* * * * *